March 18, 1941.  W. L. McGRATH  2,235,076
STARTER GEARING
Filed Dec. 24, 1937  3 Sheets-Sheet 2

Witness:
Burr W. Jones

INVENTOR.
William L. McGrath
BY Clinton L. James
ATTORNEY.

March 18, 1941.   W. L. McGRATH   2,235,076
STARTER GEARING
Filed Dec. 24, 1937   3 Sheets-Sheet 3

Witness:
Burr W. Jones

INVENTOR.
BY William L. McGrath
Clinton S. James
ATTORNEY.

Patented Mar. 18, 1941

2,235,076

UNITED STATES PATENT OFFICE 2,235,076

STARTER GEARING

William L. McGrath, Elmira, N. Y., assignor, by mesne assignments, to Bendix Aviation Corporation, South Bend, Ind., a corporation of Delaware Application December 24, 1937, Serial No. 181,672

9 Claims. (Cl. 74—6)

The present invention relates to starter gearing and more particularly to that type of gearing in which the driving connection between a starting motor and the engine to be started is controlled by power extraneous from the starting motor such as manual, magnetic or other means.

Starter gear shifts of this general type as now manufactured generally include a pinion having a driving connection with the starting motor, means for moving the pinion into and out of mesh with a member such as a flywheel gear of an engine to be started, and means for closing a switch to cause energization of the starting motor after the pinion is meshed with the flywheel gear. An example of such a starter is illustrated in the patent to Bijur No. 1,883,331.

In such devices it is customary to interpose a yielding connection in the form of a spring between the shifting means and the pinion so that if the pinion fails to mesh properly with the flywheel gear, the shifting means may continue its movement and close the starting switch. Initial rotation of the starting motor then indexes the pinion teeth into proper registry with the tooth spaces of the flywheel gear and the spring thereupon snaps the pinion into mesh.

Since the action of the starting motor is very energetic, it is necessary for the pinion to be moved into mesh very rapidly after such a tooth abutment since otherwise the pinion may fail to enter the flywheel gear but will act as a milling cutter and rapidly wear away the teeth of the gear. It is customary, therefore, to use powerful springs for mesh enforcement, spring pressures of thirty-five to forty pounds being commonly employed.

When the shifting force is derived from a pedal actuated by the operator, the force required to overcome a tooth abutment by compressing the mesh-enforcing spring merely requires an occasional extra exertion on his part, but when a magnetic shift is used, a solenoid is required capable of exerting this extra force and, therefore, much larger and more expensive than actually needed to perform the normal shifting operation. Moreover, such extra force is always exerted by the solenoid in meshing the pinion whether such extra force is needed or not, so that the pinion is violently thrown into mesh with unnecessary shock and noise.

It is an object of the present invention to provide a novel starter gear shift incorporating means for automatically enforcing proper mesh of the gearing.

It is another object to provide such a device in which a pinion is moved longitudinally into mesh with a flywheel gear, having provisions for insuring proper registry of the pinion and gear teeth.

It is a further object to provide such a device in which obstruction of the meshing movement of the pinion causes it to be indexed on its shaft.

It is another object to provide such a device in which the force necessary to move the pinion into mesh with the flywheel gear is substantially constant, irrespective of whether or not the teeth of the pinion are initially in proper registry with the tooth spaces of the gear.

It is another object to provide such a device in which meshing of the pinion with the flywheel gear is assured prior to closure of the starting switch, so that milling of the gear teeth by actuation of the starting motor prior to mesh, is prevented.

It is a further object to provide such a device in which the driving pinion is held in full mesh with the engine gear until the operator causes withdrawal thereof.

It is another object to provide such a device in which the pinion is permitted to overrun freely when the engine starts, but picks up the engine gear and resumes cranking in case of a false start.

Further objects and advantages will be apparent from the following description taken in connection with the accompanying drawings in which.

Figure 4:
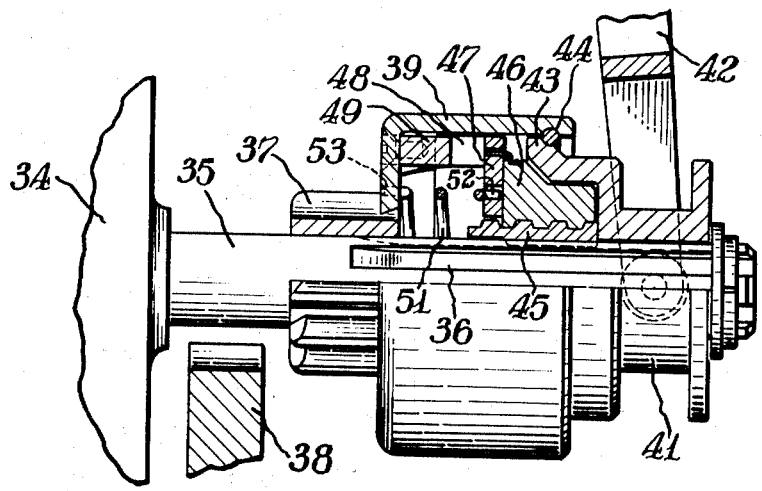
Figure 5:
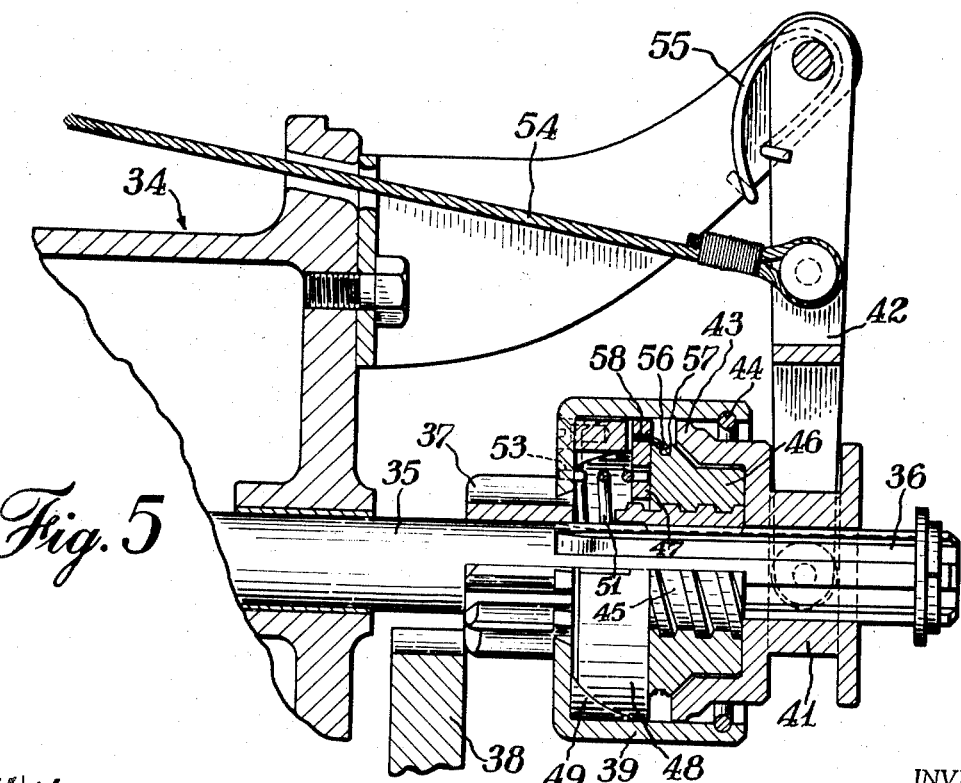

Fig. 4 is a side elevation partly in section of an embodiment of the invention adapted more particularly for the inboard type of gearing in which the pinion moves toward the starting motor while entering into mesh with the engine gear, showing the parts in idle position; and Fig. 5 is a similar view showing the parts in the positions assumed in case of tooth abutment between the pinion and engine gear.

Figure 1:
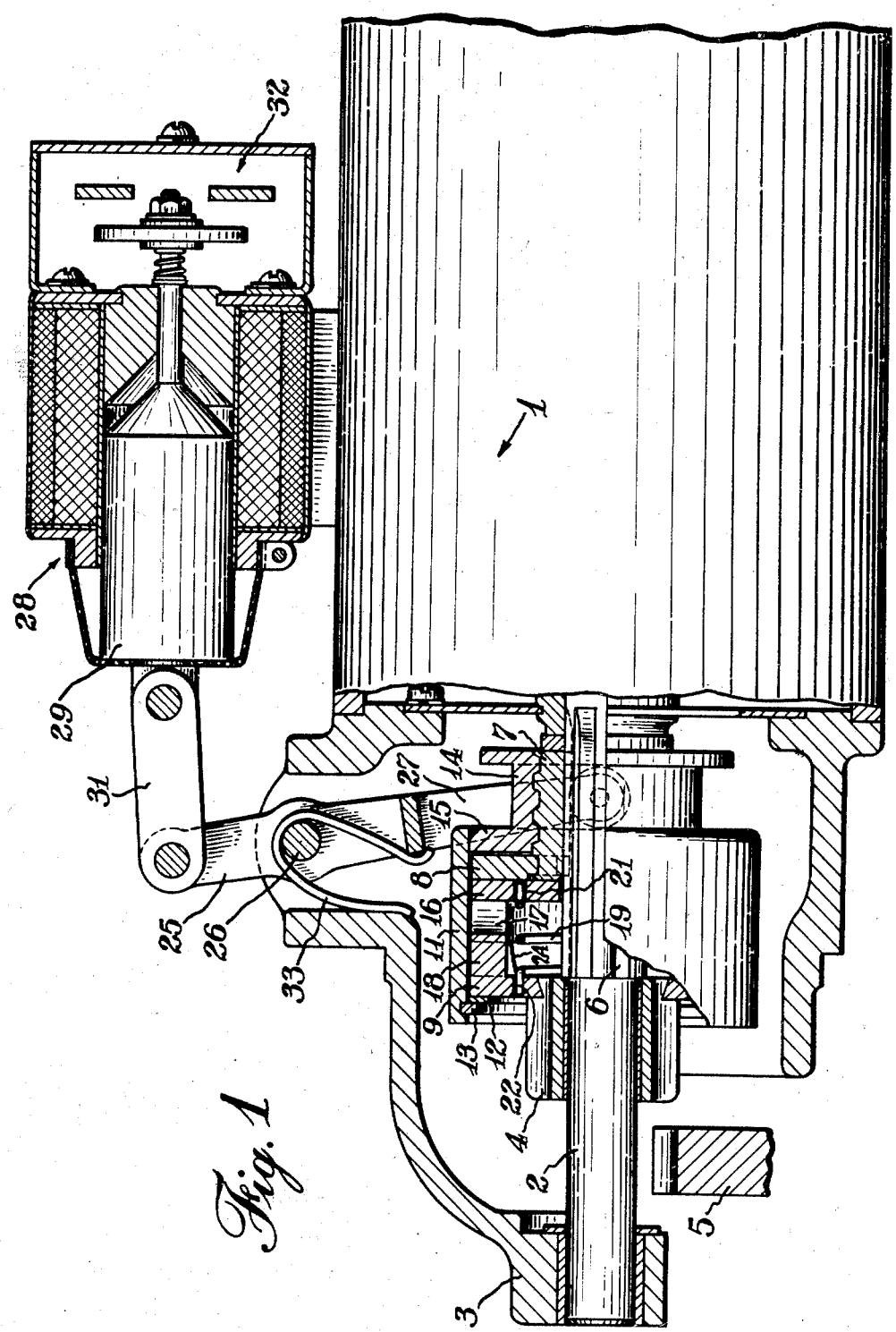
Fig. 1 is a side elevation partly broken away and in section showing a preferred embodiment of the invention with the parts in idle position.

Referring first to Fig. 1 of the drawings, a starting motor of conventional type, illustrated generally by numeral 1, is provided with a projecting armature shaft 2 which is journalled at its outer end in an outboard bearing 3. A pinion 4 is slidably mounted on the armature shaft for movement into and out of engagement with a member such as a flywheel gear 5 of an engine to be started. Armature shaft 2 is provided adjacent the motor with a splined portion 6 which may be formed integrally thereon as indicated, or may be formed on a sleeve fixed thereon. Splined on the portion 6 is an actuating member in the form of an externally threaded sleeve 7 having a clutch flange 8 formed thereon or rigidly connected therewith in any suitable manner.

A flange 9, preferably of the same diameter as the clutch flange 8, is rigidly mounted on the rear end of the pinion 4, and a barrel member 11 is loosely mounted on said flanges and is provided with a thrust collar 12 and lock ring 13 at one end to retain the flange 9 therein, while a shifting member 14 threaded on the sleeve 7 has a radial flange 15 rigidly mounted in the opposite end of the barrel 11 by suitable means such as welding.

Figure 3:
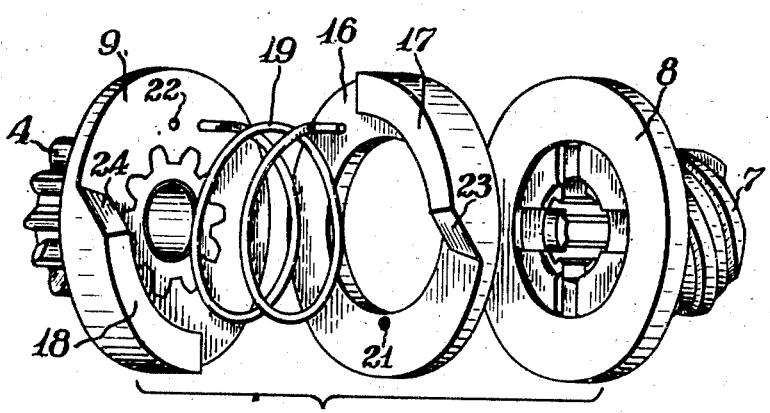
Fig. 3 is a detail in perspective of the driving pinion, the cam indexing means and the self-tightening clutch connection illustrated in disassembled relation.

An annular clutch plate 16 is loosely mounted in the barrel 11 in engagement with the clutch flange 8 of sleeve 7, and a cam connection is provided between the clutch plate 16 and the flange 9 of pinion 4 by forming cam elements 17 and 18 (Fig. 3) on the clutch plate and flange respectively.

Means are provided for ordinarily holding the cam members and consequently the sleeve 7 and pinion 4 in extending relation, here shown in the form of a torsion spring 19 anchored as indicated at 21 and 22 to the clutch plate and pinion flange respectively and so tensioned as to yieldingly urge the inclined surfaces 23 and 24 of said cams into engagement. The space between the flange 15 and the thrust collar 12 of the barrel 11 is such as to maintain the inclined surfaces 23 and 24 of the cams in partial engagement as illustrated in Fig. 1.

Means for shifting the pinion 4 into and out of engagement with the engine gear 5 is provided in the form of a shift lever 25 pivoted at 26 to the motor bearing frame, having a fork 27 adapted to engage and operate the shifting member 14. The shifting lever 25 may be operated manually, but magnetic operating means therefor are here illustrated in the form of a solenoid indicated generally by numeral 28 arranged to actuate a plunger 29 which is connected by a link 31 to the outer end of lever 25. A starting switch 32 is arranged to be closed by the solenoid so as to energize the starting motor when the pinion 4 has been shifted into operative engagement with the engine gear 5. The parts are normally maintained in their idle positions as shown in Fig. 1 by yielding means such as a spring 33.

Figure 2:
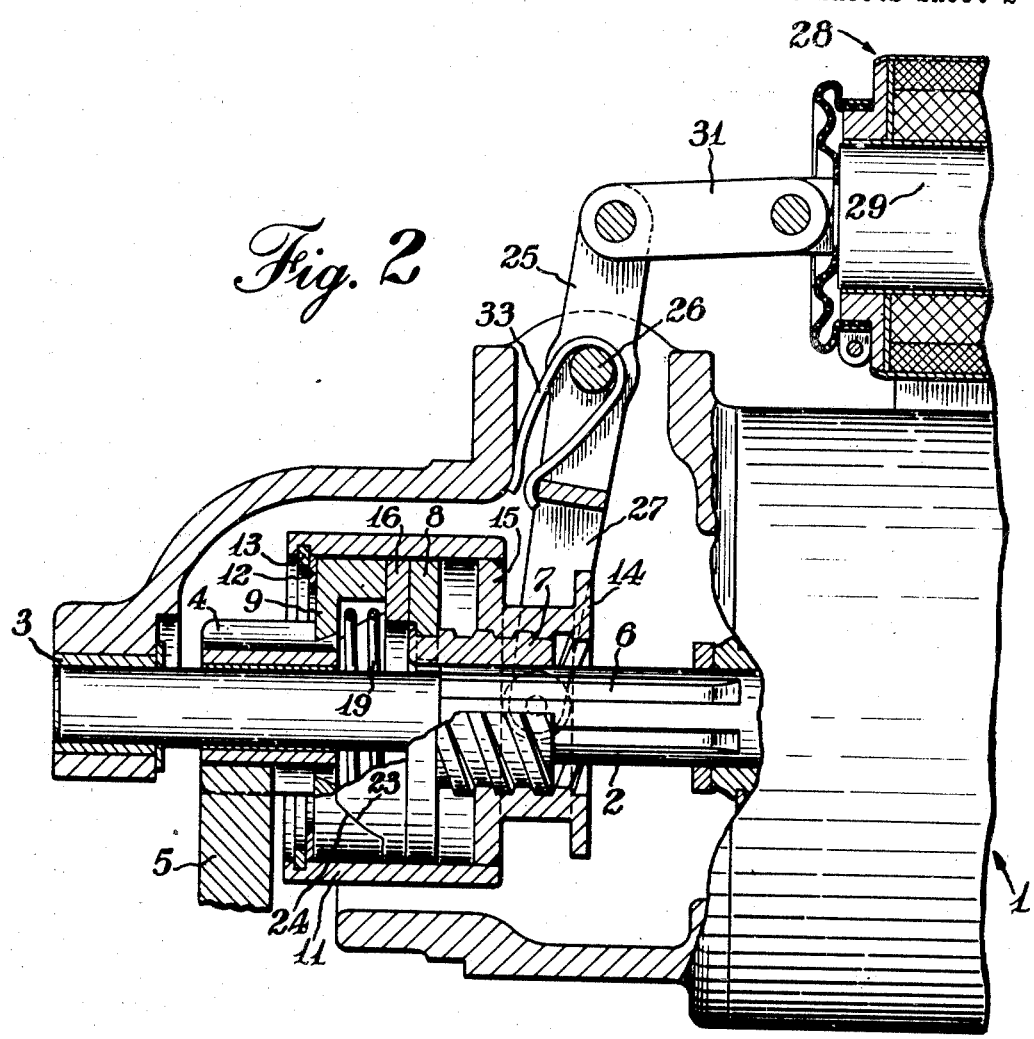
Fig. 2 is a similar view showing the parts in cranking position.

In the operation of this embodiment of the invention, energization of the solenoid by the operator causes the shifting lever 25 to be rotated in a clockwise direction, thus sliidng the shifting member 14 and the threaded sleeve 7 to the left in Fig. 1 by virtue of the engagement of flanges 15 and 8. The longitudinal motion of the clutch flange 8 is transmitted through the clutch plate 16 and cam connection 17, 18 and spring 19 to the pinion flange 9, thus causing the pinion 4 to be moved into mesh with the flywheel gear 5. When the meshing motion is completed, the starting switch 32 is closed by the solenoid, causing energization of the starting motor. The initial rotation of the starting motor transmitted through the splines 6 to the threaded sleeve 7 causes said sleeve to thread itself forward in the shifting member 14, thus compressing the cam connection 17, 18 as shown in Fig. 2 and thereafter building up pressure between the clutch flange 8 and clutch plate 16, whereby the torque of the starting motor is transmitted through the clutch and cam connection to the pinion to rotate the same and crank the engine.

When the engine starts, the overrunning action of the pinion 4 under the impetus of the flywheel gear causes the barrel 11 and shifting member 14 to overrun the threaded sleeve 7, thus relaxing the pressure on the clutch members 8, 16 and permitting the pinion and its associated parts to overrun the actuating member 7 and the armature shaft. If the initial start is abortive, and the engine does not continue to run, as soon as the flywheel slows down to a speed commensurate with the rotation of the armature shaft, the pinion 4 will be again connected to the actuating member 7 through the self-tightening action of the clutch 8, 16 as controlled by the threaded shifting member 14, so that the pinion picks up and continues to rotate the flywheel until a true start is secured. When the engine has started, deenergization of the solenoid 28 by the operator permits the spring 33 to swing the shifting lever 25 in a counterclockwise direction, thus drawing the pinion out of mesh by the engagement of the thrust collar 12 with the pinion flange 9.

If, during the meshing operation, the teeth of the pinion 4 should not be in proper registry with the tooth spaces of the gear 5 so that obstruction of the longitudinal motion of the pinion 4 occurs, continued motion of the shifting member 14 causes the inclined surface 23 of cam 17 (Fig. 3) to bear on the inclined surface 24 of the pinion cam 18, causing the pinion to be indexed in a forward direction into proper registry. Such indexing action of the pinion is assured by virtue of the large radius of the clutching surfaces on the clutch members 8, 16 which may be roughened or knurled or provided with any suitable clutch means to prevent backward rotation of the clutch cam member 16 since backward rotation of the clutch flange 8 is resisted by the static friction of the starting motor. During this indexing action, the spring 19 will be compressed, and when the indexing is effected, the spring 19 will expand, moving the pinion 4 into full mesh as above set forth.

It will be appreciated that the spring 19 is a comparatively light spring since it is used merely to maintain the cam surfaces 23, 24 in engagement and to normally hold the cam members in extended relation. Since, however, the starting motor is not energized until after the pinion has been meshed with the flywheel, it is not necessary for the spring 19 to snap the pinion into mesh in the manner of the mesh-enforcing spring of a conventional manual shift.

In the structure illustrated in Figs. 4 and 5, an inboard type of starter is illustrated in which the meshing motion of the pinion is toward the starting motor. Referring to Fig. 4, the starting motor 34 has an extended armature shaft 35, the outer end of which is splined as indicated at 36. A pinion 37 is slidably mounted on the smooth portion of the armature shaft for movement into and out of engagement with a gear 38 of an engine to be started and has a barrel member 39 rigidly fixed thereto in any suitable manner. A shifting member 41 actuated by a shift lever 42 is provided with a flange 43 fitting in the open end of barrel 39 and retained therein by suitable means such as a split lock ring 44.

An actuating member in the form of an externally threaded sleeve 45 is splined on the armature shaft, and a clutch member 46 is threaded thereon in engagement with an annular clutch plate 47 slidably mounted in the barrel. A cam connection comprising members 48, 49 rigidly connected to the clutch plate 47 and the inner end of the barrel 39 is arranged to transmit rotation from the clutch plate to the barrel and thus to the pinion 37. A spring 51 anchored to the clutch plate and barrel at 52 and 53 respectively serves to maintain the clutch connection in extended relation as limited by the space between the flange 43 of the shifting member and the inner end of the barrel.

The shifting lever 42 may be operated by any suitable means, a cable 54 being illustrated in Fig. 5 for that purpose, which cable may be actuated manually or by means of any suitable electrical or mechanical device.

The operation of this embodiment of the invention is substantially similar to that previously described, the pinion 37 being moved into and out of mesh with the engine gear 38 by means of the shifting members connected to the barrel. If tooth abutment between the pinion and flywheel gear should occur as illustrated in Fig. 5, the pinion is indexed by the action of cams 48, 49 responsive to the continued forward motion of the shifting and actuating members. After such indexing has taken place, meshing proceeds in the normal manner, after which rotation of the motor shaft causes the threaded clutch member 46 to compress the clutch and cam connection so as to initiate rotation of the engine gear by virtue or the camming action, and thereafter to transmit the rotation of the starting motor to crank the engine.

When the engine starts, the overrunning action of the pinion and barrel causes the clutch members 46, 47 to be relaxed so that the pinion and barrel are permitted to overrun while the clutch members slip on each other. Thereafter, release of the shifting lever 42 permits the parts to be returned to their idle position by suitable means such as a return spring 55.

The engaging surfaces of clutch members 46, 47 may be knurled or provided with other means for facilitating the transmission of power therebetween. In some cases it may be deemed desirable to provide means for insuring the initial engagement of the clutch members 46, 47, such means being here illustrated as a light friction spring 56 running in a groove 57 in the driving clutch member 46 and anchored as illustrated at 58 in the driven clutch plate 47. It will be understood that this friction spring is wound in such a direction that it will wind up and clamp the driving clutch member 46 when the latter tends to overrun the driven clutch plate 47, but will unwind and slip on the driving clutch member 46 when the driven clutch plate overruns.

Although certain embodiments of the invention have been shown and described in detail, it will be understood that other embodiments are possible and various changes may be made in the construction and arrangements of the parts without departing from the spirit of the invention as defined in the claims appended hereto.

What is claimed is:

1. In an engine starter, a power shaft, a pinion loosely mounted thereon for movement into and out of engagement with a member of an engine to be started, a threaded member splined to the shaft, means including cam members having axially inclined surfaces forming a cam connection between the threaded member and the pinion, means including a cooperating threaded member for maintaining the inclined surfaces of the cam members in partial engagement and operative upon rotation of the power shaft to compress said cam connection, and means for shifting the threaded member along the shaft to move the pinion into and out of operative position.

2. In an engine starter, a power shaft, a pinion loosely mounted thereon for movement into and out of engagement with a member of an engine to be started, an actuating member splined to the shaft, means including a self-tightening clutch and cam members having axially inclined surfaces forming a cam connection between the actuating member and pinion, and means maintaining the inclined surfaces of the cam members in partial engagement, said means being operated by rotation of the power shaft to compress the cam connection and clutch and transmit rotation therethrough to the pinion.

3. In a starter gear for internal combustion engines, a member adapted to engage and drive a member of the engine to be started, an actuating member therefor, means including axially shiftable clutch members and cam members having axially inclined surfaces forming a connection between the actuating member and engine driving member, means normally holding said cam members in axially extending relation, and means responsive to rotation of the actuating member for axially compressing said clutch and cam members to transmit rotation therethrough.

4. In a starter gear for internal combustion engines, a member adapted to engage and drive a member of the engine to be started, an actuating member therefor, means including a friction clutch and cam members having axially inclined surfaces forming a cam connection between the actuating member and engine driving member, yielding means normally holding said cam members in axially extending relation, means for moving the actuating member longitudinally to place the driving member in operative position, said cam connection being operative to index the driving member with respect to the actuating member in case such engaging movement is obstructed, and means responsive to rotation of the actuating member for tightening said clutch and cam connection to transmit rotation therethrough.

5. In an engine starter, a pinion, an actuating member, means including a clutch and cam members having axially inclined surfaces connecting the actuating member to the pinion, means normally holding said cam members in axially extending relation, and means including a barrel member mounted on the actuating member and pinion for maintaining the inclined surfaces of the cam members in partial engagement, said last means being further operative to compress the cam members and clutch for transmission of torque therethrough.

6. In an engine starter, a pinion, an actuating member, means including a friction clutch and cam members having axially inclined surfaces connecting the actuating member to the pinion, yielding means normally holding said cam members in axially extending relation, means including a barrel member mounted on the actuating member and pinion for maintaining the inclined surfaces of the cam members in partial engagement, and means for moving the pinion and barrel assembly to place the pinion in operative position, said cam members being arranged to index the pinion with respect to the actuating member in case such movement thereof is obstructed.

7. In an engine starter, a pinion, an actuating member, means including a friction clutch and cam members having axially inclined surfaces connecting the actuating member to the pinion, yielding means normally holding said cam members in axially extending relation, means including a barrel member mounted on the actuating member and pinion for maintaining the inclined surfaces of the cam members in partial engagement, and means for moving the pinion and barrel assembly to place the pinion in operative position, said cam members being arranged to index the pinion with respect to the actuating member in case such movement thereof is obstructed, said actuating member and barrel having an inclined connection therebetween operative by rotation of the actuating member to compress the connection between the actuating member and pinion.

8. In an engine starter, a power shaft, a pinion slidably journalled thereon, a driving clutch member rotated by the power shaft and slidable thereon, a driven clutch member, means transmitting rotation from the driven clutch member to the pinion comprising means to cause relative rotation between the driven clutch member and the pinion responsive to relative longitudinal movement thereof, and torque-responsive means for pressing together the clutch members and transmitting means.

9. In an engine starter, a power shaft, a pinion slidably journalled thereon, a driving clutch plate rotated by the power shaft and slidable thereon, a driven clutch plate, means including axially extending cams for transmitting rotation from the driven clutch plate to the pinion, said cams cooperating to cause relative rotation between the driven clutch plate and the pinion responsive to relative longitudinal movement thereof, means for shifting the driving clutch plate along the power shaft, and torque-responsive means for pressing together the clutch plates and transmitting cams to form a driving connection from the power shaft to the pinion.

WILLIAM L. McGRATH.